(12) United States Patent
Choi et al.

(10) Patent No.: US 9,898,199 B2
(45) Date of Patent: Feb. 20, 2018

(54) DATA STORAGE DEVICE AND OPERATING METHOD THEREOF

(71) Applicant: SK hynix Inc., Gyeonggi-do (KR)

(72) Inventors: An Ho Choi, Gyeonggi-do (KR); Jun Seop Chung, Gyeonggi-do (KR)

(73) Assignee: Sk Hynix Inc., Gyeonggi-do (KR)

( * ) Notice: Subject to any disclaimer, the term of this patent is extended or adjusted under 35 U.S.C. 154(b) by 94 days.

(21) Appl. No.: 14/983,338

(22) Filed: Dec. 29, 2015

(65) Prior Publication Data

US 2017/0038969 A1 Feb. 9, 2017

(30) Foreign Application Priority Data

Aug. 4, 2015 (KR) ........................ 10-2015-0110042

(51) Int. Cl.
*G06F 3/06* (2006.01)

(52) U.S. Cl.
CPC ............ *G06F 3/061* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| 2008/0172520 A1* | 7/2008 | Lee ..................... G11C 11/5628 711/103 |
| 2008/0250220 A1* | 10/2008 | Ito ....................... G06F 12/0246 711/173 |
| 2015/0248244 A1* | 9/2015 | Seo ....................... G06F 3/0611 711/103 |
| 2016/0203075 A1* | 7/2016 | Shin .................... G11C 7/1039 711/103 |

FOREIGN PATENT DOCUMENTS

| KR | 1020120055544 | 5/2012 |
| KR | 1020150015012 | 2/2015 |

* cited by examiner

*Primary Examiner* — Denise Tran
(74) *Attorney, Agent, or Firm* — IP & T Group LLP

(57) ABSTRACT

A data storage device includes a nonvolatile memory device including a buffer region and a main region; and a controller suitable for controlling a buffer write operation of the nonvolatile memory device such that write-requested first data is stored in the buffer region, and controlling a main write operation of the nonvolatile memory device such that the first data stored in the buffer region is stored in the main region according to a write mode, wherein the nonvolatile memory device performs the buffer write operation regardless of the write mode.

16 Claims, 12 Drawing Sheets

DATA STORAGE DEVICE AND OPERATING METHOD THEREOF

CROSS-REFERENCES TO RELATED APPLICATION

The present application claims priority under 35 U.S.C. §119(a) to Korean application number 10-2015-0110042, filed on Aug. 4, 2015, which is incorporated herein by reference in its entirety.

BACKGROUND

1. Technical Field

Various embodiments generally relate to a data storage device, and, more particularly, to a write mode of a data storage device.

2. Related Art

A data storage device stores data provided from an external device in response to a write request from the external device. The data storage device also provides the external device with stored data in response to a read request from the external device. The external device is an electronic device capable of processing data, and may include a computer, a digital camera, a cellular phone and the like. The data storage device may be embedded in the external device, or may be fabricated separately and then coupled to the external device.

The data storage device may be prepared in the form of a Personal Computer Memory Card International Association (PCMCIA) card, a Compact Flash (CF) card, a smart media card, a memory stick, various multimedia cards (MMC, eMMC, RS-MMC, and MC-Micro), various secure digital cards (SD, Mini-SD, and Micro-SD), a Universal Flash Storage (UFS), a Solid State Drive (SSD) and the like.

The data storage device may include a nonvolatile memory apparatus to store data. Nonvolatile memory is able to retain stored data even without a constant source of power. Nonvolatile memory includes flash memory, such as NAND flash or NOR flash, Ferroelectrics Random Access Memory (FeRAM), Phase-Change Random Access Memory (PCRAM), Magnetoresistive Random Access Memory (MRAM), Resistive Random Access Memory (ReRAM), and the like.

SUMMARY

In an embodiment, a data storage device may include: nonvolatile memory device including a buffer region and a main region; and a controller suitable for controlling a buffer write operation of the nonvolatile memory device such that write-requested first data is stored in the buffer region, and controlling a main write operation of the nonvolatile memory device such that the first data stored in the buffer region is stored in the main region according to a write mode, wherein the nonvolatile memory device performs the buffer write operation regardless of the write mode.

In an embodiment, a method for operating a data storage device may include: receiving a write request; controlling a buffer write operation such that write-requested first data is stored in a buffer region of a nonvolatile memory device; and controlling a main write operation such that the first data stored in the buffer region is stored in a main region of the nonvolatile memory device according to a write mode, wherein the buffer write operation is performed regardless of the write mode.

DETAILED DESCRIPTION

Hereinafter, a data storage device and an operating method thereof will be described below with reference to the accompanying drawings through various embodiments.

Figure 1:
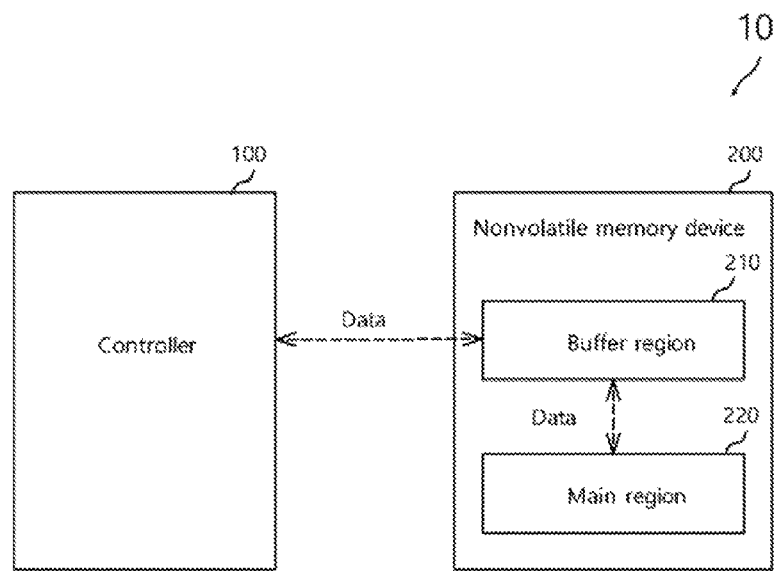
FIG. 1 is a block diagram illustrating a data storage device in accordance with an embodiment.

FIG. 1 is a block diagram illustrating a data storage device 10 in accordance with an embodiment.

Referring to FIG. 1, the data storage device 10 may include a controller 100 and a nonvolatile memory device 200.

The controller 100 may control the general operations of the data storage device 10. The controller 100 may store data in the nonvolatile memory device 200 in response to a write request transmitted from an external device, and may read data stored in the nonvolatile memory device 200 and output the read data to the external device in response to a read request transmitted from the external device.

When a write request is received from the external device, the controller 100 may control a buffer write operation of the nonvolatile memory device 200 such that write-requested data is stored in a buffer region 210. The controller 100 may transmit a buffer write command to the nonvolatile memory device 200 to control the buffer write operation of the nonvolatile memory device 200.

The controller 100 may control a main write operation of the nonvolatile memory device 200 such that data stored in the buffer region 210 is stored in a main region 220 according to a write mode. The controller 100 may control the main write operation of the nonvolatile memory device 200 after completion of the buffer write operation of the nonvolatile memory device 200. The controller 100 may transmit a main write command to the nonvolatile memory device 200 to control the main write operation of the nonvolatile memory device 200.

The controller 100 may control a mode setting operation of the nonvolatile memory device 200 such that the write mode of the nonvolatile memory device 200 is set to a predetermined write mode. The controller 100 may transmit a mode setting command to the nonvolatile memory device 200 to control the mode setting operation of the nonvolatile memory device 200.

The controller 100 may control the mode setting operation of the nonvolatile memory device 200 such that a write mode is set according to the number of bits to be stored in each memory cell of the main region 220. For example, the controller 100 may control the mode setting operation such that a write mode is set to a single level cell (SLC) mode when 1 bit is to be stored in each memory cell of the main region 220. For example, the controller 100 may control the mode setting operation such that a write mode is set to a multi-level cell (MLC) mode when 2 bits are to be stored in each memory cell of the main region 220. For example, the controller 100 may control the mode setting operation such that a write mode is set to a triple level cell (TLC) mode when 3 bits are to be stored in each memory cell of the main region 220. As the number of bits to be stored in each memory cell is increased, a write speed may be slowed down.

When a write request is received, the controller 100 may determine the size of data corresponding to the write request, and may select a write mode of the nonvolatile memory device 200 according to the determination. The controller 100 may control the mode setting operation such that the write mode of the nonvolatile memory device 200 is set to a selected write mode. For example, when the size of data corresponding to a write request is determined as "small", the controller 100 may control the mode setting operation such that a write mode is set to the SLC mode. For example, when the size of data corresponding to a write request is determined as "medium", the controller 100 may control the mode setting operation such that a write mode is set to the MLC mode. For example, when the size of data corresponding to a write request is determined as "large" the controller 100 may control the mode setting operation such that a write mode is set to the TLC mode. As will be described later, the controller 100 may determine the size of data as "small", "medium" or "large" based on predetermined reference values.

While storing data in the nonvolatile memory device 200 according to the write mode selected through data size determination, the controller 100 may change the write mode. For example, the controller 100 may determine whether it is a data overflow state, and may change the write mode when it is determined that it is the data overflow state. That is to say, when it is detected that data having a size beyond the determined data size are write-requested or are to be write-requested, the controller 100 may change a current write mode, for example, the SLC mode, to the write mode in which an increased number of bits may be stored in each memory cell, for example, the MLC mode or the TLC mode.

Since the write mode cannot be changed in the course of the main write operation, the controller 100 may change the write mode after completion of the main write operation. During the main write operation, the controller 100 may not simply stand by until the completion of the main write operation but may perform the buffer write operation. As will be described later, the buffer write operation is independent from the main write operation. The buffer write operation may be performed regardless of the write mode. Therefore, even before the write mode is changed or even while the main write operation is performed according to a current write mode, the buffer write operation may be performed. The buffer write operation may be performed regardless of the write mode of the main region 220. Therefore, operating time may be saved.

The nonvolatile memory device 200 may include the buffer region 210 and the main region 220. The buffer region 210 may be volatile. In other words, data stored in the buffer region 210 may be not retained any more in the buffer region 210 when power is off. The main region 220 may be nonvolatile. In other words, data stored in the main region 220 may be continuously retained in the main region 220 even though power is off.

The nonvolatile memory device 200 may perform the mode setting operation in response to a mode setting command such that the write mode is set to one of the SLC, MLC and TLC modes.

The nonvolatile memory device 200 may perform the buffer write operation for storing data in the buffer region 210 in response to a buffer write command. The nonvolatile memory device 200 may perform the buffer write operation regardless of the write mode. The nonvolatile memory device 200 may independently perform the buffer write operation while performing the mode setting operation. The nonvolatile memory device 200 may independently perform the buffer write operation while performing the main write operation according to the write mode. The nonvolatile memory device 200 may report completion of the buffer write operation to the controller 100 when the buffer write operation is completed.

The nonvolatile memory device 200 may perform the main write operation for storing data, which is stored in the buffer region 210, in the main region 220 according to the write mode in response to a main write command. The nonvolatile memory device 200 may report completion of the main write operation to the controller 100 when the main write operation is completed.

Figure 2:
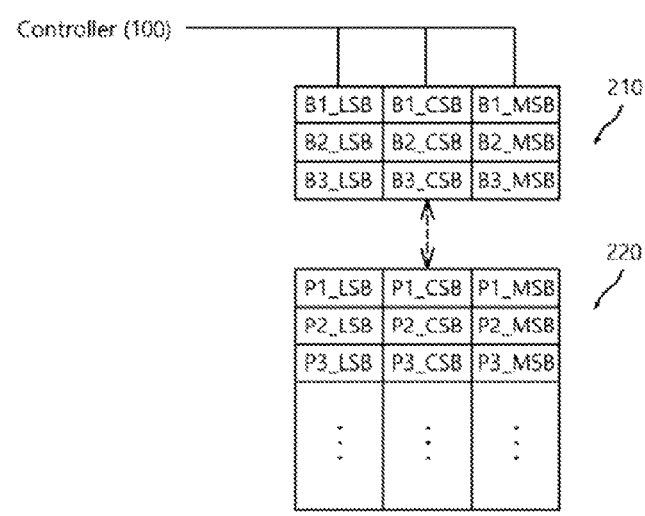
FIG. 2 is a diagram illustrating a buffer region and a main region shown in FIG. 1.

FIG. 2 is a diagram illustrating the buffer region 210 and the main region 220 shown in FIG. 1.

Referring to FIG. 2, the main region 220 may include a plurality of pages P1_LSB to P3_MSB. Pages one of a single row in the main region 220 may correspond to a single word line. For example, the pages P1_LSB, P1_CSB and P1_MSB may correspond to a single word line. Pages of a single word line may be classified into different types according to a type of data bit to be stored in the memory cells electrically coupled to the single word line. For example, when 3 bits are stored in each memory cell, a page in which least significant bit (LSB) data is stored may be an LSB page a page in which central significant bit (CSB) data is stored may be a CSB page, and a page in which most significant bit (MSB) data is stored may be an MSB page. In the main region 220 different columns may represent the LSB pages, the CSB pages and the MSB pages, respectively.

The nonvolatile memory device 200 may perform the main write operation such that data is written in a single page corresponding to a single word line or is simultaneously written in a plurality of pages corresponding to a single word line according to the write mode. The nonvolatile memory device 200 may perform the main write operation such that data is written in 1 page, for example, the LSB page corresponding to a single word line according to, for example, the SLC mode. The nonvolatile memory device 200 may perform the main write operation such that data is written in 2 pages, for example, the LSB page and the CSB page corresponding to a single word line according to, for example, the MLC mode. The nonvolatile memory device 200 may perform the main write operation such that data is written in 3 pages, for example, the LSB page, the CSB page and the MSB page corresponding to a single word line according to, for example, the TLC mode.

Data which is transmitted from the controller 100 and is to be written in the main region 220 and data which is read from the main region 220 and is to be transmitted to the controller 100 may be temporarily stored in the buffer region 210. The buffer region 210 may include a plurality of buffer parts B1_LSB to B3_MSB. The buffer parts B1_LSB to B3_MSB may correspond to the page types of the main region 220. Namely, when the main region 220 includes the LSB, CSB and MSB pages, the buffer parts B1_LSB to B3_MSB may include LSB buffer parts B1_LSB to B3_LSB corresponding to the LSB pages, CSB buffer parts B1_CSB to B3_CSB corresponding to the CSB pages and MSB buffer parts B1_MSB to B3_MSB corresponding to the MSB pages. For example, in the buffer region 210, different columns may represent the LSB buffer parts, the CSB buffer parts and the MSB buffer parts, respectively.

The nonvolatile memory device 200 may randomly access the buffer parts B1_LSB to B3_MSB under the control of the controller 100. That is to say, data may be written in a designated buffer part at random in the buffer region 210 under the control of the controller 100. The nonvolatile memory device 200 may write data in a designated buffer part under the control of the controller 100 regardless of corresponding relation between the buffer parts B1_LSB to B3_LSB and the page types of the main region 220. The nonvolatile memory device 200 may perform the buffer write operation regardless of a current write mode.

While FIG. 2 shows that the buffer region 210 includes 9 buffer parts, the number of buffer parts included in the buffer region 210 is not limited to this number.

While FIG. 2 shows an example in which maximum 3-bit data are stored in each memory cell of the main region 220, it is to be noted that the embodiment is not limited to this example. Page types of the main region 220 may be changed according to a maximum number of bits to be stored in each memory cell, and the configuration of buffer parts of the buffer region 210 may be changed according to the page types.

Figure 3A:
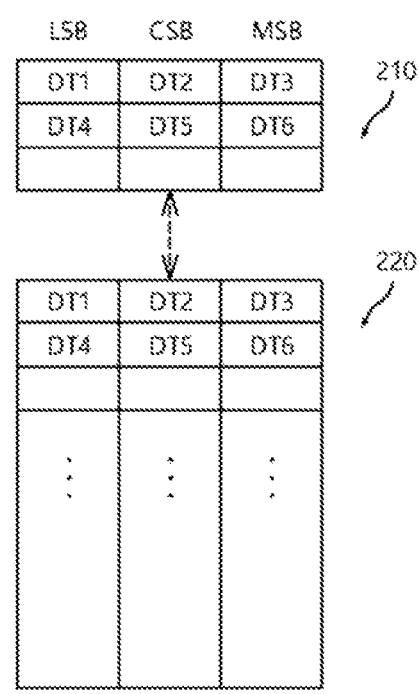
FIGS. 3A to 3C are diagrams illustrating buffer write operation and main write operation in accordance with an embodiment.
Figure 3B:
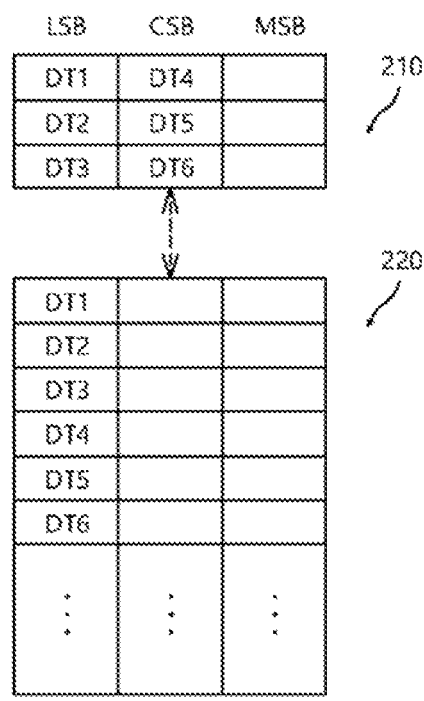
Figure 3C:
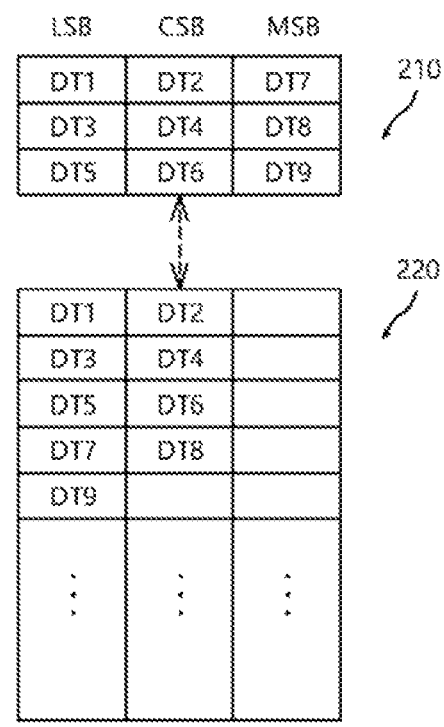

FIGS. 3A to 3C are diagrams illustrating a buffer write operation and a main write operation in accordance with an embodiment. FIGS. 3A to 3C each illustrate a state in which data are stored in the buffer region 210 through the buffer write operation before they are stored in the main region 220, and a state in which the data stored in the buffer region 210 are stored in the main region 220 through the main write operation. In FIGS. 3A to 3C, columns of the buffer region 210 and the main region 220 may represent LSB buffer parts and LSB pages, CSB buffer parts and CSB pages, and MSB buffer parts and MSB pages, respectively.

Referring to FIG. 3A, the write mode may be, for example, the TLC mode. Data may be stored in the buffer parts respectively corresponding to page types before they are simultaneously stored in 3 pages corresponding to a single word line in the main region 220. For example, data DT1 may be stored in the LSB buffer part before it is stored in the LSB page, data DT2 may be stored in the CSB buffer part before it is stored in the CSB page, and data DT3 may be stored in the MSB buffer part before it is stored in the MSB page.

Referring to FIG. 3B, the write mode may be, for example, the SLC mode. Data DT1, DT2 and DT3 may be stored in the LSB buffer parts corresponding to the page type before they are stored in the LSB pages of the main region 220. Data DT4, DT5 and DT6 may be stored in the CSB buffer parts regardless of the page type before they are stored in the LSB pages of the main region 220.

Referring to FIG. 3C, the write mode may be for example, the MLC mode. Some data may be stored in the buffer parts respectively corresponding to the page types before they are simultaneously stored in 2 pages corresponding to a single word line in the main region 220. For example, data DT1 may be stored in the LSB buffer part before it is stored in the LSB page, and data DT2 may be stored in the CSB buffer part before it is stored in the CSB page. Data DT7 and DT8 may be stored in the MSB buffer parts regardless of the page type before they are simultaneously stored in 2 pages corresponding to a single word line in the main region 220.

In summary, data may be stored in the buffer part corresponding to the type of a page in which it is to be stored in the main region 220, or may be stored in the buffer part regardless of the type of a page in which it is to be stored in the main region 220. For example, data may be preferentially stored in the buffer part corresponding to the type of a page in which it is to be stored in the main region 220, and may be stored in the buffer part regardless of the type of a page in which it is to be stored in the main region 220 when the data may not be stored in the buffer part corresponding to the type of a page in which it is to be stored in the main region 220.

Figure 4:
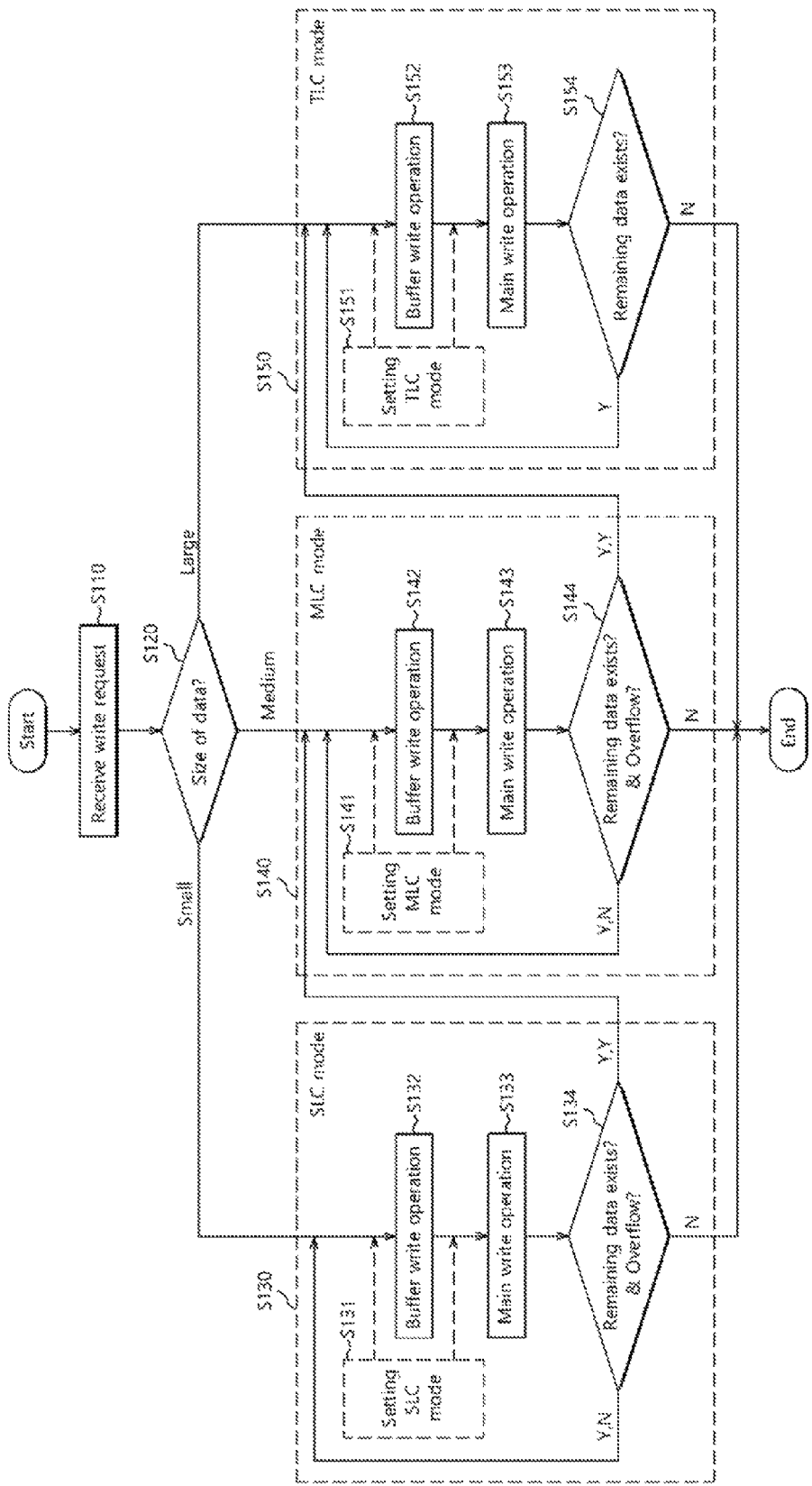
FIG. 4 is a flow chart illustrating a method for operating the data storage device of FIG. 1.

FIG. 4 is a flow chart illustrating a method for operating the data storage device 10 of FIG. 1 in accordance with an embodiment.

Referring to FIG. 4 at step S110, the controller 100 may receive a write request from an external device.

At step S120, the controller 100 may determine the size of data corresponding to the write request. For example, the controller 100 may determine the size of entire data corresponding to the write request through the size of the data transmitted up to a current time from the external device according to the write request. For example, the controller 100 may determine the size of data based on past processing records for write requests. For example, the controller 100 may determine the size of data as "small" when it is determined that the size of data is to be smaller than a first reference value. The controller 100 may determine the size of data as "medium" when it is determined that the size of data is to be between the first reference value and a second reference value. The controller 100 may determine the size of data as "large" when it is determined that the size of data is larger than the second reference value. According to a determined size of data, the process may proceed to step S130, step S140 or step S150.

At step S130, the controller 100 may process write-requested data through the SLC mode. In other words, when the size of data corresponding to the write request is determined as "small", the controller 100 may set the nonvolatile memory device 200 to the SLC mode to quickly write data.

At step S131, the controller 100 may control the mode setting operation of the nonvolatile memory device 200 such that a write mode is set to the SLC mode. The controller 100 may transmit a mode setting command to the nonvolatile memory device 200 such that the SLC mode is set.

According to an embodiment, the controller 100 may control the mode setting operation before controlling the buffer write operation of the nonvolatile memory device 200 at step S132.

According to an embodiment the controller 100 may control the mode setting operation after controlling the buffer write operation of the nonvolatile memory device 200 at step S132 and before controlling the main write operation of the nonvolatile memory device 200 at step S133.

According to an embodiment, the controller 100 may control the nonvolatile memory device 200 such that the buffer write operation and the mode setting operation are simultaneously performed to save operating time.

According to an embodiment, when the main write operation is currently being performed in the nonvolatile memory device 200, the controller 100 may control the mode setting operation when it is determined that the main write operation under performance is completed.

According to an embodiment, the controller 100 may not control the mode setting operation when the write mode is already set to the SLC mode and resetting to the SLC mode is not needed.

At step S132, the controller 100 may control the buffer write operation of the nonvolatile memory device 200 such that the write-requested data is stored in the buffer region 210. The controller 100 may transmit a buffer write command to the nonvolatile memory device 200 such that the buffer write operation is performed. The nonvolatile memory device 200 may perform the buffer write operation under the control of the controller 100. Since the buffer write operation may be performed regardless of the write mode, the nonvolatile memory device 200 may independently perform the buffer write operation while performing the main write operation for data previously transmitted according to a current write mode. Also, the nonvolatile memory device 200 may independently perform the buffer write operation even while performing the mode setting operation.

At step S133, the controller 100 may control the main write operation of the nonvolatile memory device 200 such that the data stored in the buffer region 210 is stored in the main region 220 according to the SLC mode. The controller 100 may transmit a main write command to the nonvolatile memory device 200 such that the main write operation is performed. The nonvolatile memory device 200 may perform the main write operation according to the SLC mode under the control of the controller 100.

At step S134, the controller 100 may determine whether remaining data exists. Further, when it is determined that remaining data exists, the controller 100 may determine whether it is a data overflow state.

When it is determined at step S134 that remaining data does not exist ("N" of step S134) the process may end.

When it is determined at step S134 that remaining data exists but it is not a data overflow state ("Y, N" of step S134), the process may proceed to step S132. At step S132, the controller 100 may control the buffer write operation of the nonvolatile memory device 200 such that remaining data is stored in the buffer region 210. At this time the nonvolatile memory device 200 may perform the buffer write operation while performing the main write operation for previous data under the control of the controller 100 at step S133. As a result, the controller 100 may continuously process remaining data according to the SLC mode through the buffer write operation of step S132 and the main write operation of step S133. When the process returns from step S134 to step S132, because the write mode is already set to the SLC mode, step S131 may not be performed.

When it is determined at step S134 that remaining data exists and it is a data overflow state ("Y, Y" of step S134), the process may proceed to step S140.

At step S140, the controller 100 may process write-requested data through the MLC mode. When it is determined that the size of data corresponding to a write request is "medium" or it is determined that it is the data overflow state, the controller 100 may set the nonvolatile memory device 200 to the MLC mode to simultaneously write 2-bit data in each memory cell.

Step S141 to step S144 may be performed similarly to step S131 to step S134 except that the write mode is the MLC mode.

At step S142, the controller 100 may control the buffer write operation of the nonvolatile memory device 200 such that write requested data are stored in the buffer region 210. At this time, the nonvolatile memory device 200 may independently perform the buffer write operation while performing the main write operation for previous data under the control of the controller 100 at step S133.

When it is determined at step S144 that remaining data exists and it is a data overflow state ("Y, Y" of step S144), the process may proceed to step S150.

At step S150, the controller 100 may process write-requested data through the TLC mode. When it is determined that the size of data corresponding to a write request is "large" or it is determined that it is the data overflow state, the controller 100 may set the nonvolatile memory device 200 to the TLC mode to simultaneously write 3-bit data in each memory cell.

Step S151 to step S154 may be performed similar to step S131 to step S134 except that the write mode is the TLC mode and determination of a data overflow state is not performed at step S154.

While FIG. 4 shows an example in which the controller 100 changes the write mode to the MLC mode when it is determined that it is the data overflow state under the SLC mode, it is to be noted that the invention is not limited to this example. According to an embodiment, the controller 100 may change the write mode from the SLC mode to the TLC mode when it is determined there is the data overflow state.

Figure 5:
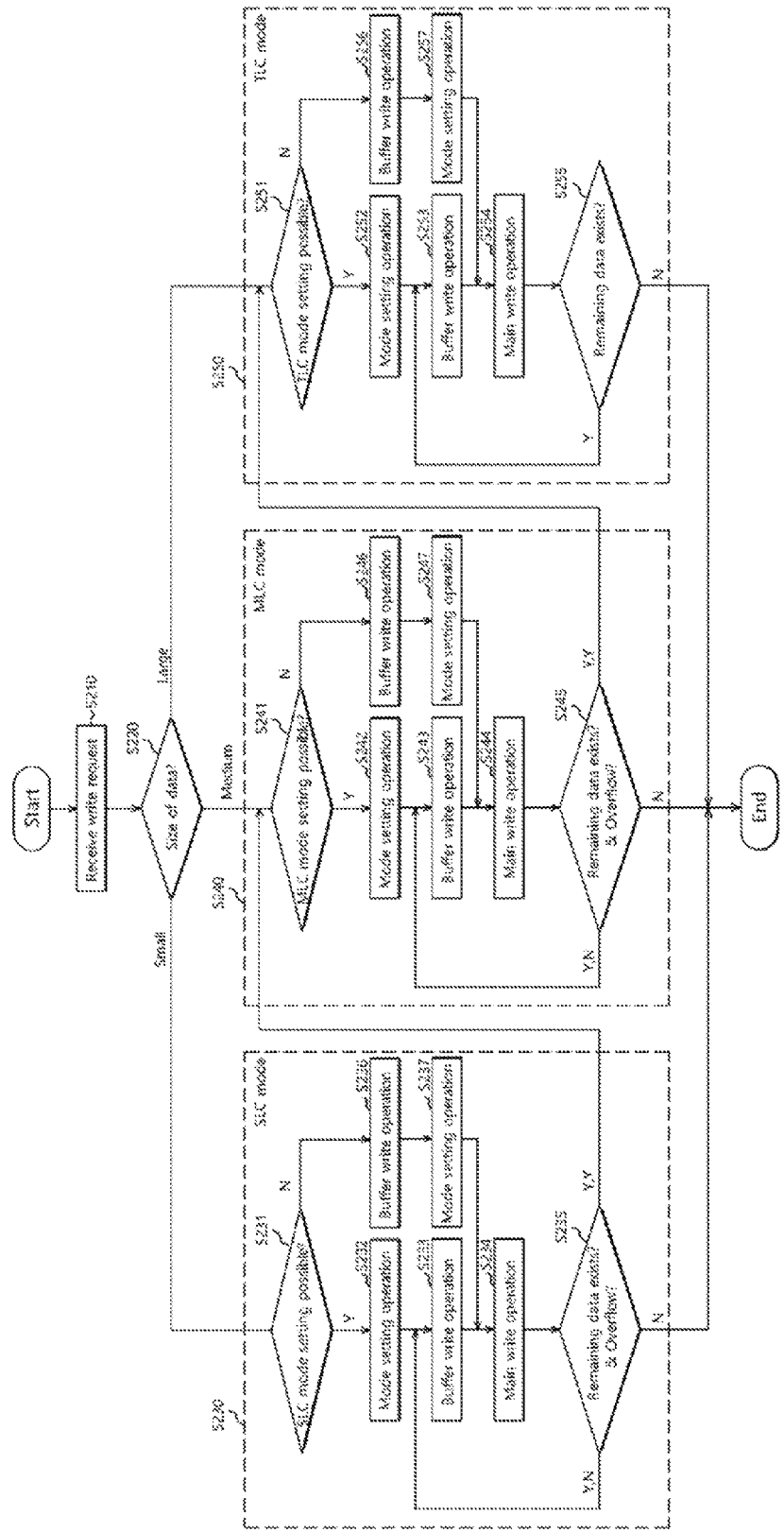
FIG. 5 is a flow chart illustrating a method for operating the data storage device of FIG. 1.

FIG. 5 is a flow chart illustrating a method for opera rig the data storage device 10 in accordance with an embodiment. FIG. 5 shows an example of the process of FIG. 4 where steps S131, S141 and S151 for controlling the mode setting operation are performed before steps S132, S142 and S152 for controlling the buffer write operation. In FIG. 5, the mode setting operation may be controlled before the buffer write operation, and may be controlled after the buffer write operation when it is impossible to perform the mode setting operation before the buffer write operation.

Referring to FIG. 5, step S210 and step S220 may be substantially the same as step S110 and step S120 of FIG. 4. Step S235, step S245 and step S255 may be substantially the same as step S134, step S144 and step S154 of FIG. 4.

At step S230, the controller 100 may process write-requested data through the SLC mode.

At step S231, the controller 100 may determine whether it is possible to set the write mode to the SLC mode. For example, when the main write operation is not being performed in the nonvolatile memory device 200, the controller 100 may determine that it is possible to set the write mode to the SLC mode ("Y" of step S231), and the process may proceed to step S232.

At step S232, the controller 100 may control the mode setting operation of the nonvolatile memory device 200 such that the write mode is set to the SLC mode. The nonvolatile memory device 200 may perform the mode setting operation under the control of the controller 100 such that the write mode is set to the SLC mode.

At step S233, the controller 100 may control the buffer write operation of the nonvolatile memory device 200 such that the write-requested data is stored in the buffer region 210. The nonvolatile memory device 200 may perform the buffer write operation under the control of the controller 100. The nonvolatile memory device 200 may independently perform the buffer write operation while performing the mode setting operation under the control of the controller 100 at step S232.

Conversely, at step S231, for example, when the main write operation is being performed in the nonvolatile memory device 200, the controller 100 may determine that it is impossible to set the write mode to the SLC mode ("N" of step S231) and the process may proceed to step S236.

At step S236, the controller 100 may control the buffer write operation of the nonvolatile memory device 200 such that the write-requested data is stored in the buffer region 210. The nonvolatile memory device 200 may perform the buffer write operation under the control of the controller 100. The nonvolatile memory device 200 may independently perform the buffer write operation even while currently performing the main write operation.

At step S237, the controller 100 may control the mode setting operation of the nonvolatile memory device 200 such that the write mode is set to the SLC mode. The controller 100 may control the mode setting operation of step S237 when it is determined that it is possible to set the write mode to the SLC mode or that the main write operation is completed in the nonvolatile memory device 200. The nonvolatile memory device 200 may perform the mode setting operation under the control of the controller 100 such that the write mode is set to the SLC mode. The nonvolatile memory device 200 may perform the mode setting operation while performing the buffer write operation under the control of the controller 100 at step S236.

In summary, even though it is impossible to perform the mode setting operation since the main write operation is currently being performed, the controller 100 may first control the buffer write operation to be performed regardless of the write mode, thereby minimizing an operation delay.

At step S234, the controller 100 may control the main write operation of the nonvolatile memory device 200 such that the data stored in the buffer region 210 is stored in the main region 220 according to the SLC mode. The nonvolatile memory device 200 may perform the main write operation according to the SLC mode under the control of the controller 100.

At step S235, the controller 100 may determine whether remaining data exists. When it is determined that remaining data exists, the controller 100 may determine whether it is a data overflow state. When it is determined that remaining data does not exist ("N" of step S235), the process may be ended.

When it is determined at step S235 that remaining data exists but it is not a data overflow state ("Y, N" of step S235) the process may proceed to step S213. That is to say, the controller 100 may continuously process remaining data according to the SLC mode through the buffer write operation of step S233 and the main write operation of step S234.

When it is determined at step S235 that remaining data exists and it is a data overflow state ("Y, Y" of step S235), the process may proceed to step S240.

At step S240, the controller 100 may process write-requested data through the MLC mode. When it is determined that the size of data corresponding to a write request is "medium" or it is determined that it is the data overflow state, the controller 100 may set the nonvolatile memory device 200 to the MLC mode to simultaneously write 2-bit data in each memory cell.

Step S241 to step S247 may be performed similarly as step S231 to step S237 except that the write mode is the MLC mode. When it is determined at step S245 that remaining data exists and it is the data overflow state ("Y, Y" of step S245) the process may proceed to step S250.

At step S250, the controller 100 may process write-requested data through the TLC mode. When it is determined that the size of data corresponding to the write request is "large" or it is determined that it is the data overflow state, the controller 100 may set the nonvolatile memory device 200 to the TLC mode to simultaneously write 3-bit data in each memory cell.

Step S251 to step S257 may be performed similar to step S231 to step S237 except that the write mode is the TLC mode and determination of the data overflow state is not performed at step S255.

Figure 6:
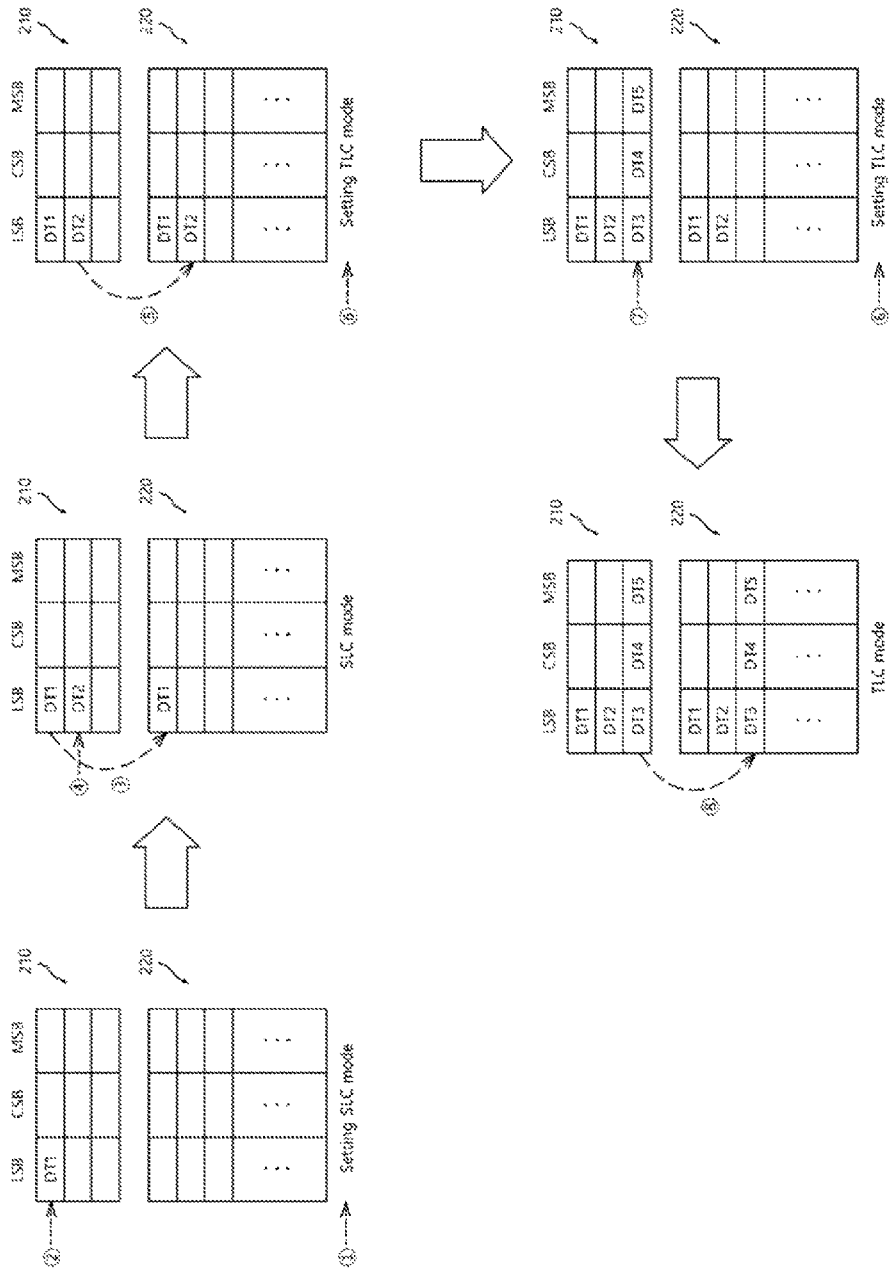
FIGS. 6 and 7 are diagrams illustrating a method for operating the data storage device of FIG. 1.
Figure 7:
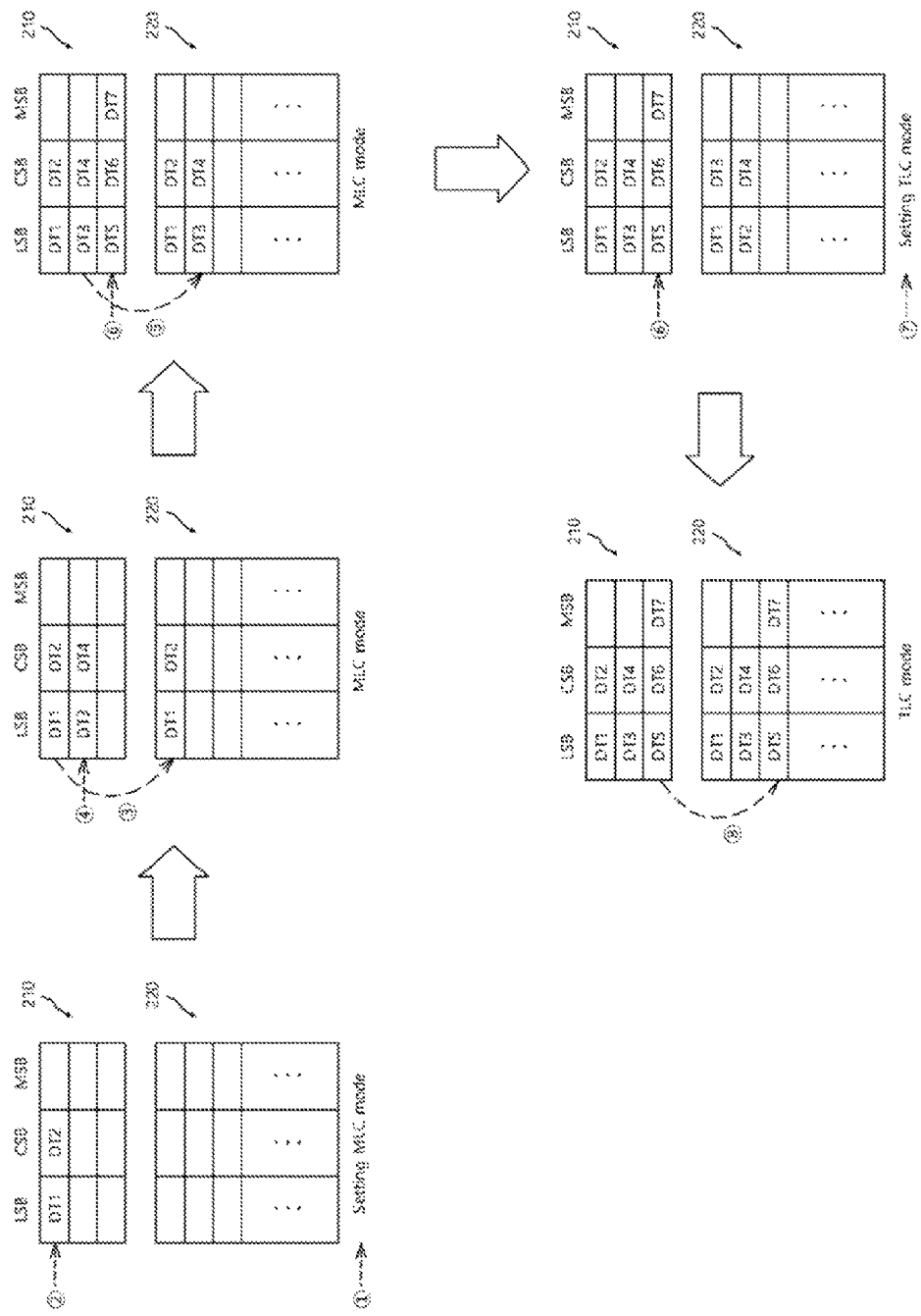

FIGS. 6 and 7 are diagrams illustrating a method for operating the data storage device 10 in accordance with the embodiment. In FIGS. 6 and 7, the data storage device 10 may operate according to the descriptions made above with reference to FIG. 5. In the following description, a circled number indicates the same as shown in the figures.

Referring to FIG. 6, as a result of determining the size of data corresponding to a write request as "small", the controller 100 may control the mode setting operation of the nonvolatile memory device 200 such that the write mode is set to the SLC mode ((1)). The controller 100 may control the buffer write operation of the nonvolatile memory device 200 such that write-requested data DT1 is stored in the buffer region 210 ((2)).

The controller 100 may control the main write operation of the nonvolatile memory device 200 such that the data DT1 stored in the buffer region 210 is stored in the main region 220 according to the SLC mode ((3)). The controller 100 may control the buffer write operation of the nonvolatile memory device 200 such that remaining data DT2 is stored in the buffer region 210 ((4)). At this time, the nonvolatile memory device 200 may independently perform the buffer write operation ((4)) while performing the main write operation ((3)). Therefore, operating time may be saved.

The controller 100 may control the main write operation of the nonvolatile memory device 200 such that the data DT2 stored in the buffer region 210 is stored in the main region 220 according to the SLC mode ((5)). Then the controller 100 may determine that it is the data overflow state, and may determine that it is necessary to change the write mode to the TLC mode. When it is determined that the main write operation ((5)) is completed in the nonvolatile memory device 200, the controller 100 may control the mode setting operation of the nonvolatile memory device 200 such that the write mode is set to the TLC mode ((6)).

The controller 100 may control the buffer write operation of the nonvolatile memory device 200 such that remaining data DT3, DT4 and DT5 are stored in the buffer region 210 ((7)). At this time, since the buffer write operation is performed regardless of the write mode, the nonvolatile memory device 200 may perform the buffer write operation ((7)) even though the mode setting operation ((6)) is being performed. Therefore, operating time may be saved.

The controller 100 may control the main write operation of the nonvolatile memory device 200 such that the data DT3, DT4 and DT5 stored in the buffer region 210 are stored in the main region 220 according to the TLC mode ((8)).

Referring to FIG. 7, as a result of determining the size of data corresponding to a write request as "medium", the controller 100 may control the mode setting operation of the nonvolatile memory device 200 such that the write mode is set to the MLC mode ((1)). The controller 100 may control the buffer write operation of the nonvolatile memory device 200 such that write-requested data DT1 and DT2 are stored in the buffer region 210 ((2)).

The controller 100 may control the main write operation of the nonvolatile memory device 200 such that the data DT1 and DT2 stored in the buffer region 210 are stored in the main region 220 according to the MLC mode ((3)). The controller 100 may control the buffer write operation of the nonvolatile memory device 200 such that remaining data DT3 and DT4 are stored in the buffer region 210 (④). At this time, the nonvolatile memory device 200 may independently perform the buffer write operation (④) while performing the main write operation (③). Therefore, operating time may be saved.

The controller 100 may control the main write operation of the nonvolatile memory device 200 such that the data DT3 and DT4 stored in the buffer region 210 are stored in the main region 220 according to the MLC mode (⑤). Then, the controller 100 may determine that it is the data overflow state, and may determine that it is necessary to change the write mode to the TLC mode. When it is determined that the main write operation (⑤) is still being performed in the nonvolatile memory device 200, since the write mode cannot be immediately changed, the controller 100 may control the buffer write operation of the nonvolatile memory device 200 such that remaining data DT5, DT6 and DT7 are stored in the buffer region 210 (⑥). Since the buffer write operation is performed regardless of the write mode, the controller 100 may store the data DT5, DT6 and DT7 in the buffer region 210 even before the write mode is set to the TLC mode. The nonvolatile memory device 200 may independently perform the buffer write operation (⑥) while performing the main write operation (⑤). Therefore, operating time may be saved.

Thereafter, when it is determined that the main write operation (⑤) is completed in the nonvolatile memory device 200, the controller 100 may control the mode setting operation of the nonvolatile memory device 200 such that the write mode is set to the TLC mode (⑦). At this time, since the mode setting operation is performed independently of the buffer write operation, the nonvolatile memory device 200 may perform the mode setting operation (⑦) even though the buffer write operation (⑥) is being performed. Therefore, operating time may be saved.

The controller 100 may control the main write operation of the nonvolatile memory device 200 such that the data DT5, DT6 and DT7 stored in the buffer region 210 are stored in the main region 220 according to the TLC mode (⑧).

Figure 8:
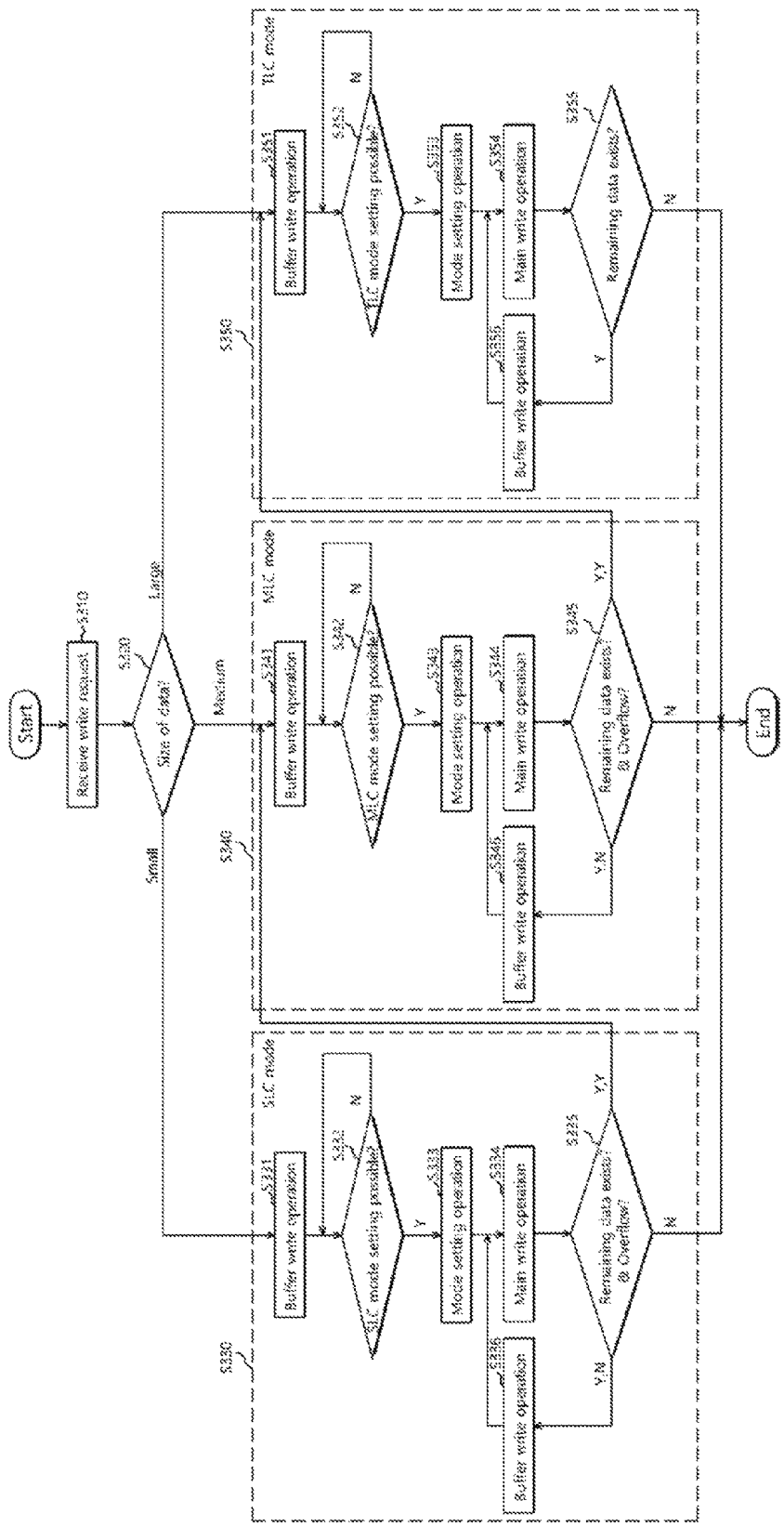
FIG. 8 is a flow chart illustrating a method for operating the data storage device of FIG. 1.

FIG. 8 is a flow chart illustrating a method for operating the data storage device 10 in accordance with an embodiment. FIG. 8 shows an example of the process of FIG. 4 where steps S131, S141 and S151 for controlling the mode setting operation are performed after steps S132, S142 and S152 for controlling the buffer write operation. Since the buffer write operation may be performed regardless of the write mode, the buffer write operation may be preferentially controlled in comparison with the mode setting operation and thus operation delay may be suppressed.

Referring to FIG. 8, step S310 and step S320 may be substantially the same as step S110 and step S120 of FIG. 4. Step S335, step S345 and step S355 may be substantially the same as step S134, step S144 and step S154 of FIG. 4.

At step S330, the controller 100 may process write-requested data through the SLC mode.

At step S331, the controller 100 may control the buffer write operation of the nonvolatile memory device 200 such that write-requested data is stored in the buffer region 210. The nonvolatile memory device 200 may perform the buffer write operation under the control of the controller 100. The nonvolatile memory device 200 may independently perform the buffer write operation even while the main write operation is being performed.

At step S332, the controller 100 may determine whether it is possible to set the write mode to the SLC mode. For example, when the main write operation is being performed in the nonvolatile memory device 200, the controller 100 may determine that it is impossible to set the write mode to the SLC mode ("N" of step S332), and the process may stay at step S332. For example, when the main write operation is not being performed in the nonvolatile memory device 200, the controller 100 may determine that it is possible to set the write mode to the SLC mode ("Y" of step S332), and the process may proceed to step S333.

At step S333, the controller 100 may control the mode setting operation of the nonvolatile memory device 200 such that the write mode is set to the SLC mode. The nonvolatile memory device 200 may perform the mode setting operation under the control of the controller 100 such that the write mode is set to the SLC mode. The nonvolatile memory device 200 may independently perform the mode setting operation while the buffer write operation is being performed under the control of the controller 100 at step S331.

At step S334, the controller 100 may control the main write operation of the nonvolatile memory device 200 such that the data stored in the buffer region 210 is stored in the main region 220 according to the SLC mode. The nonvolatile memory device 200 may perform the main write operation according to the SLC mode under the control of the controller 100.

At step S335, the controller 100 may determine whether remaining data exists. When it is determined that remaining data exists, the controller 100 may determine whether it is the data overflow state. When it is determined that remaining data does not exist ("N" of step S335), the process may be ended.

When it is determined at step S335 that remaining data exists but it is not the data overflow state ("N" of step S335), the process may proceed to step S336. In other words, the controller 100 may continuously process remaining data according to the SLC mode through the buffer write operation of step S336 and the main write operation of step S334.

When it is determined at step S335 that remaining data exists and it is the data overflow state ("Y, Y" of step S335) the process may proceed to step S340.

At step S340, the controller 100 may process write-requested data through the MLC mode. When it is determined that the size of data corresponding to a write request is "medium" or it is determined that it is the data overflow state, the controller 100 may set the nonvolatile memory device 200 to the MLC mode to simultaneously write 2-bit data in each memory cell.

Step S341 to step S346 may be performed substantially similar to step S331 to step S336 except that the write mode is the MLC mode. When it is determined at step S345 that remaining data exists and it is the data overflow state ("Y, Y" of step S345), the process may proceed to step S350.

At step S350, the controller 100 may process write-requested data through the TLC mode. When it is determined that the size of data corresponding to a write request is "large" or it is determined that it is the data overflow state, the controller 100 may set the nonvolatile memory device 200 to the TLC mode to simultaneously write 3-bit data in each memory cell.

Step S351 to step S356 may be performed similarly to step S331 to step S336 except that the write mode is the TLC mode and determination of the data overflow state is not performed at step S355.

Figure 9:
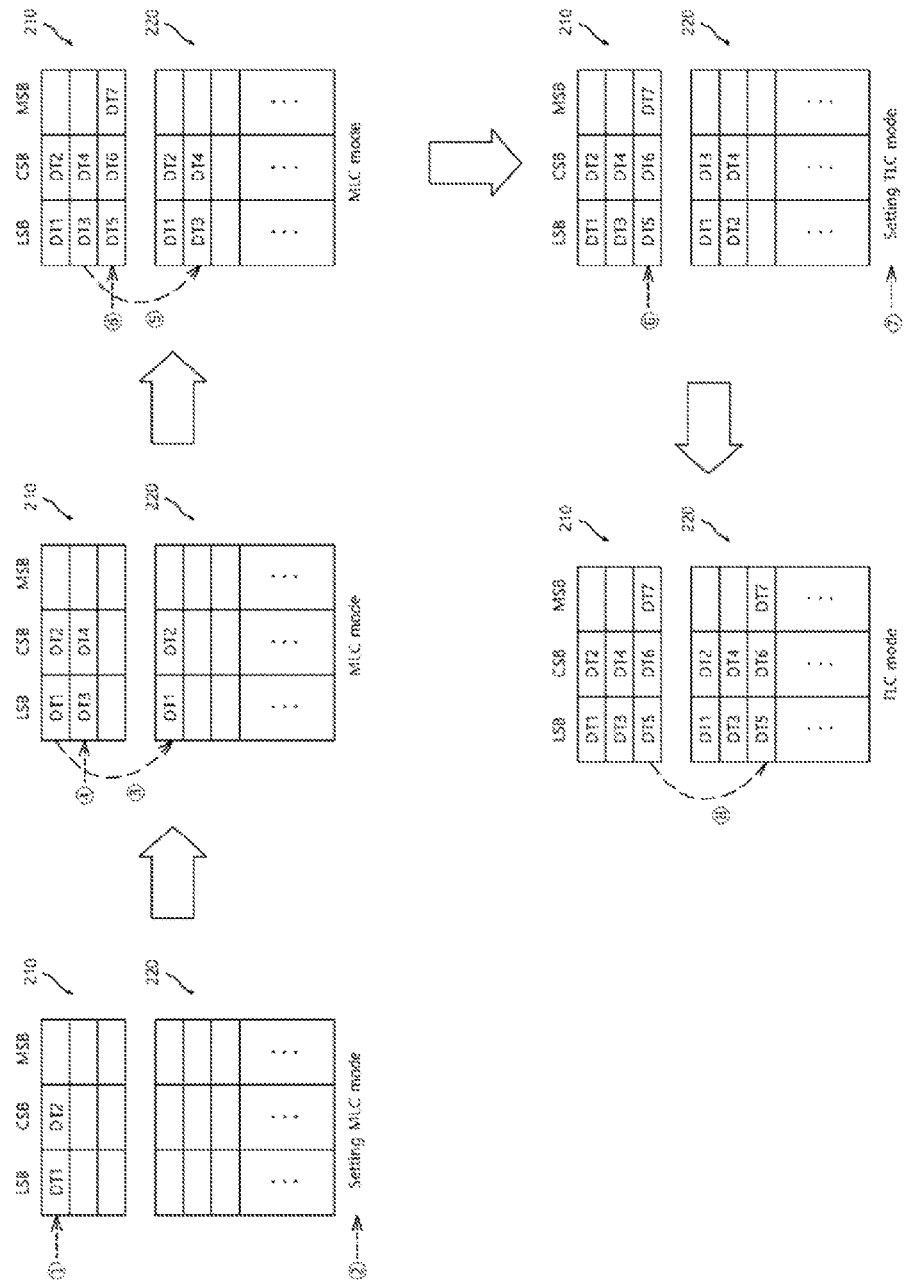
FIG. 9 is a diagram illustrating a method for operating the data storage device of FIG. 1.

FIG. 9 is a diagram illustrating a method for operating the data storage device 10 in accordance with the embodiment. In FIG. 9, the data storage device 10 may operate according to the descriptions made above with reference to FIG. 8.

Referring to FIG. 9, the controller 100 may control the buffer write operation of the nonvolatile memory device 200 such that write-requested data DT1 and DT2 are stored in the buffer region 210 (①). As a result of determining the size of data corresponding to a write request as "medium", the controller 100 may control the mode setting operation of the nonvolatile memory device 200 such that the write mode is set to the MLC mode (②).

The controller 100 may control the main write operation of the nonvolatile memory device 200 such that the data DT1 and DT2 stored in the buffer region 210 are stored in the main region 220 according to the MLC mode (③). The controller 100 may control the buffer write operation of the nonvolatile memory device 200 such that remaining data DT3 and DT4 are stored in the buffer region 210 (④). At this time, the nonvolatile memory device 200 may independently perform the buffer write operation (④) while the main write operation is being performed (③). Therefore, operating time may be saved.

The controller 100 may control the main write operation of the nonvolatile memory device 200 such that the data DT3 and DT4 stored in the buffer region 210 are stored in the main region 220 according to the MLC mode (⑤). Then, the controller 100 may determine that it is the data overflow state and may determine that it is necessary to change the write mode to the TLC mode. The controller 100 may control the buffer write operation before controlling the mode setting operation. Namely, the controller 100 may control the buffer write operation of the nonvolatile memory device 200 such that remaining data DT5, DT5 and DT7 are stored in the buffer region 210 (⑥). At this time, since the buffer write operation is performed regardless of the write mode, the controller 100 may store the data DT5, DT6 and DT7 in the buffer region 210 even before the write mode is set to the TLC mode. The nonvolatile memory device 200 may perform the buffer write operation (⑥) while the main write operation is being performed (⑤). Therefore, operating time may be saved.

Thereafter, when it is determined that the main write operation is completed in the nonvolatile memory device 200, the controller 100 may control the mode setting operation of the nonvolatile memory device 200 such that the write mode is set to the TLC mode (⑦). At this time, since the mode setting operation is performed independently from the buffer write operation, the nonvolatile memory device 200 may perform the mode setting operation (⑦) even though the buffer write operation is being performed (⑥). Therefore, operating time may be saved.

The controller 100 may control the main write operation of the nonvolatile memory device 200 such that the data DT5, DT6 and DT7 stored in the buffer region 210 are stored in the main region 220 according to the TLC mode (⑧).

Figure 10:
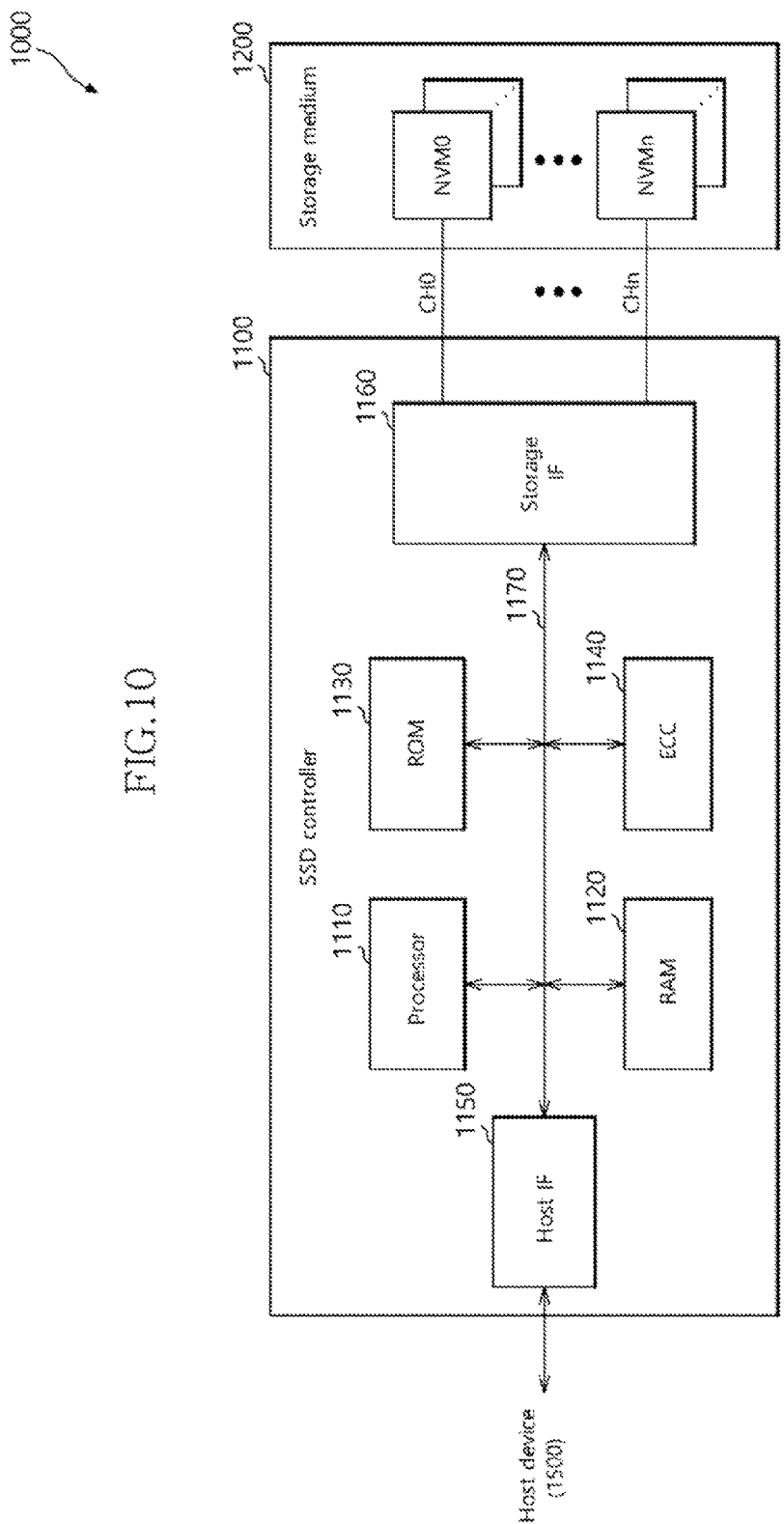
FIG. 10 is a block diagram illustrating a solid state accordance with an embodiment.

FIG. 10 is a block diagram illustrating a solid state drive (SSD) 1000 in accordance with an embodiment.

The SSD 1000 may include an SW controller 1100 and a storage medium 1200.

The SSD controller 1100 may control the data exchange between a host device 1500 and the storage medium 1200. The SSD controller 1100 may operate in a manner similar to the controller 100 of FIG. 1. The SSD controller 1100 may control the mode setting operation the buffer write operation and the main write operation of each of nonvolatile memory devices NVM0 to NVMn to store the data write-requested from the host device 1500, in the storage medium 1200. The SSD controller 1100 may include a processor 1110, a RAM 1120, a ROM 1130 an ECC unit 1140, a host interface unit 1150, and a storage interface unit 1160.

The processor 1110 may control the general operations of the SSD controller 1100. The processor 1110 may store data in the storage medium 1200 and read stored data from the storage medium 1200 according to requests from the host device 1500. In order to efficiently manage the storage medium 1200, the processor 1110 may control the internal operations of the SSD 1000 such as a merge operation, a wear leveling operation, and so forth.

The RAM 1120 may store programs and program data to be used by the processor 1110. The RAM 1120 may temporarily store the data transmitted from the host interface unit 1150 before transferring it to the storage medium 1200, and may temporarily store the data transmitted from the storage medium 1200 before transferring it to the host device 1500.

The ROM 1130 may store program codes to be read by the processor 1110. The program codes may include commands to be processed by the processor 1110 for the processor 1110 to control the internal units of the SSD controller 1100.

The ECC unit 1140 may encode data to be stored in the storage medium 1200, and may decode the data read from the storage medium 1200. The ECC unit 1140 may detect and correct errors, according to an ECC algorithm.

The host interface unit 1150 may exchange data processing requests, data etc with the host device 1500.

The storage interface unit 1160 may transmit control signals and data to the storage medium 1200. The storage interface unit 1160 may be transmitted with data from the storage medium 1200. The storage interface unit 1160 may be electrically coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may include a buffer region and a main region and may perform a mode setting operation, a buffer write operation and a main write operation under the control of the SSD controller 1100, like the nonvolatile memory device 200 shown in FIG. 1.

Figure 11:
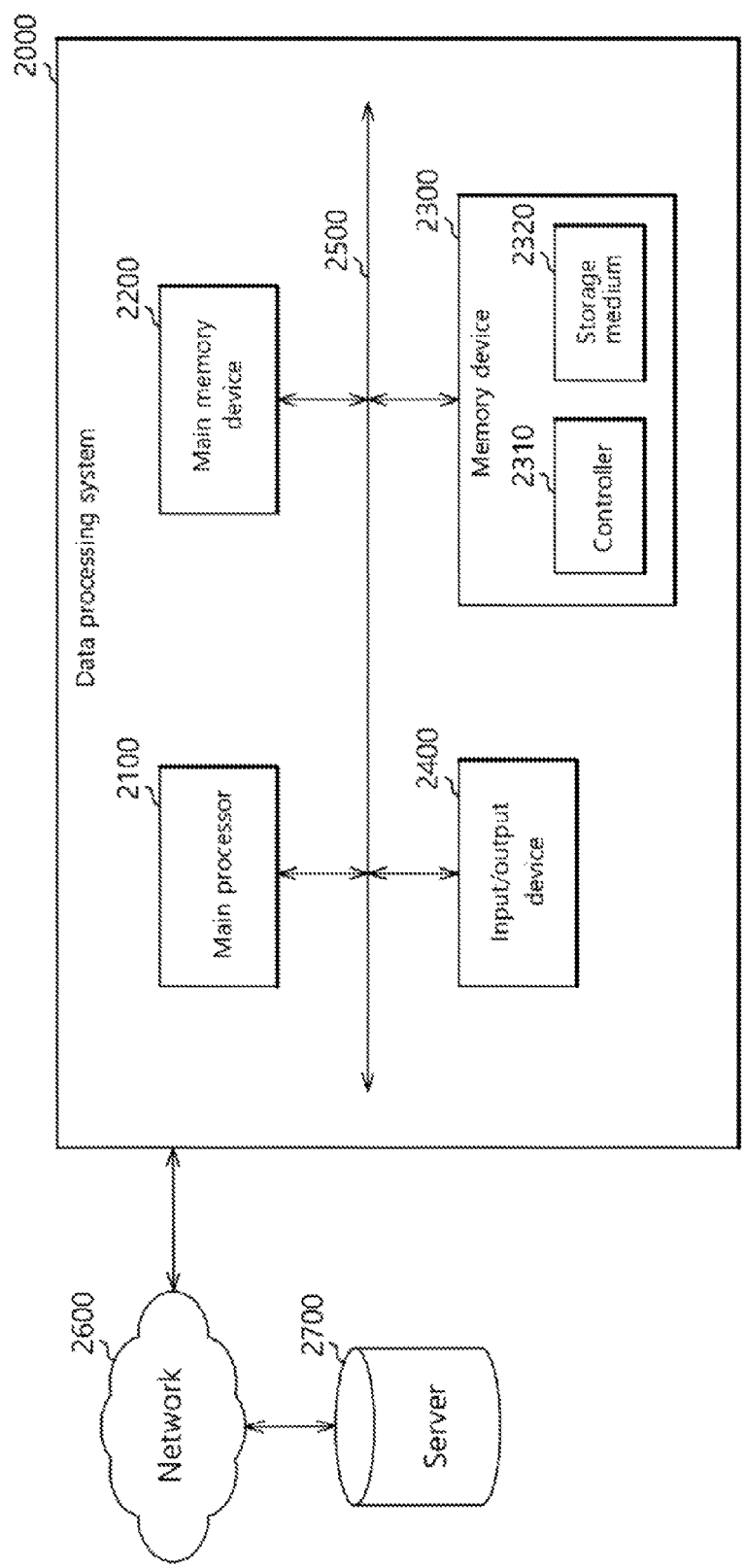
FIG. 11 is a block diagram illustrating a data processing system to which the data storage device in accordance with the embodiment is applied.

FIG. 11 is a block diagram illustrating a data processing system 2000 to which the data storage device 100 in accordance with the embodiment is applied.

The data processing system 2000 may include a computer, a laptop, a netbook, a smart phone, a digital TV a digital camera, a navigator, etc. The data processing system 2000 may include a main processor 2100, a main memory device 2200, a memory device 2300, and an input/output device 2400. The internal units of the data processing system 2000 may exchange data, control signals, etc. through a system bus 2500.

The main processor 2100 may control the general operations of the data processing system 2000. The main processor 2100 may be, for example, a central processing unit such as a microprocessor. The main processor 2100 may execute the software of an operation system, an application, a device driver, and so forth, on the main memory device 2200.

The main memory device 2200 may store programs and program data to be used by the main processor 2100. The main memory device 2200 may temporarily store data to be transmitted to the memory device 2300 and the input/output device 2400.

The memory device 2300 may include a memory controller 2310 and a storage medium 2320. The memory controller 2310 may be configured in similar manner as the controller 100 of FIG. 1. The storage medium 2320 may include the nonvolatile memory device 200 of FIG. 1.

The input/output device 2400 may include a keyboard, a scanner, a touch screen a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface unit (not shown) to access the network 2600.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device comprising:
 a nonvolatile memory device including a buffer region and a main region; and
 a controller suitable for controlling a buffer write operation of the nonvolatile memory device in a manner that write-requested first data is stored in the buffer region, and controlling a main write operation of the nonvolatile memory device in a manner that the first data stored in the buffer region is stored in the main region according to a write mode,
 wherein the nonvolatile memory device performs the buffer write operation regardless of the write mode,
 wherein the buffer region includes a plurality of buffer parts corresponding to types of pages included in the main region, and
 wherein the nonvolatile memory device randomly accesses the plurality of buffer parts.

2. The data storage device according to claim 1, wherein, before controlling the main write operation, the controller determines a size of data corresponding to a write request, and controls a mode setting operation of the nonvolatile memory device according to the determination in a manner that the write mode is set to a first write mode.

3. The data storage device according to claim 2, wherein the nonvolatile memory device independently performs the mode setting operation while the buffer write operation is being performed under control of the controller.

4. The data storage device according to claim 1, wherein, when it is determined that it is a data overflow state for the write request, the controller controls the mode setting operation of the nonvolatile memory device in a manner that the write mode is set to a second write mode.

5. The data storage device according to claim 4, wherein, when it is determined that the main write operation is not being performed, the controller controls the mode setting operation.

6. The data storage device according to claim 4, wherein, when it is determined that the main write operation is being performed, the controller controls the buffer write operation instead of the mode setting operation in a manner that write-requested second data is stored in the buffer region.

7. The data storage device according to claim 4, wherein the controller controls the buffer write operation in a manner that write-requested second data is stored in the buffer region regardless of the second write mode, and controls the main write operation in a manner that the second data stored in the buffer region is stored in the main region according to the second write mode.

8. The data storage device according to claim 1, wherein the write mode is set according to the number of bits to be stored in each memory cell of the main region.

9. A method for operating a data storage device, comprising:
 receiving a write request;
 controlling a buffer write operation in a manner that write-requested first data is stored in a buffer region of a nonvolatile memory device; and
 controlling a main write operation in a manner that the first data stored in the buffer region is stored in a main region of the nonvolatile memory device according to a write mode,
 wherein the buffer write operation is performed regardless of the write mode,
 wherein the buffer region includes a plurality of buffer parts corresponding to types of pages included in the main region, and
 wherein the nonvolatile memory device randomly accesses the plurality of buffer parts.

10. The method according to claim 9, wherein, before the controlling of the main write operation, the method further comprises:
 determining a size of data corresponding to the write request; and
 controlling a mode setting operation according to the determining of the size in a manner that the write mode is set to a first write mode.

11. The method according to claim 10, wherein the mode setting operation is independently performed while the buffer write operation is being performed.

12. The method according to claim 9, further comprising:
 determining whether it is the data overflow state for the write request; and
 controlling the mode setting operation according to the determining of whether it is the data overflow state in a manner that the write mode is set to a second write mode.

13. The method according to claim 12, further comprising:
 determining whether the main write operation is being performed,
 wherein the controlling of the mode setting operation is performed when it is determined that the main write operation is not being performed.

14. The method according to claim 12, further comprising:
 determining whether the main write operation is being performed; and
 controlling the buffer write operation instead of the mode setting operation in a manner that write-requested second data is stored in the buffer region when it is determined that the main write operation is being performed.

15. The method according to claim 12, further comprising:
 controlling the buffer write operation in a manner that write-requested second data is stored in the buffer region regardless of the second write mode; and
 controlling the main write operation in a manner that the second data stored in the buffer region is stored in the main region according to the second write mode.

16. The method according to claim 9, wherein the write mode is set according to the number of bits to be stored in each memory cell of the main region.

* * * * *